(12) United States Patent
Liu et al.

(10) Patent No.: US 12,072,537 B2
(45) Date of Patent: Aug. 27, 2024

(54) FIBER OPTIC CONNECTOR AND METHOD OF ASSEMBLING THE SAME

(71) Applicant: CommScope Telecommunications (Shanghai) Co. Ltd., Shanghai (CN)

(72) Inventors: Lei Liu, Hangzhou (CN); Zhaoyang Tong, Shanghai (CN)

(73) Assignee: COMMSCOPE TELECOMMUNICATIONS (SHANGHAI) CO. LTD., Shanghai (CN)

( * ) Notice: Subject to any disclaimer, the term of this patent is extended or adjusted under 35 U.S.C. 154(b) by 0 days.

(21) Appl. No.: 18/045,051

(22) Filed: Oct. 7, 2022

(65) Prior Publication Data

US 2023/0137768 A1 May 4, 2023

Related U.S. Application Data

(63) Continuation of application No. 17/316,166, filed on May 10, 2021, now Pat. No. 11,506,844, which is a
(Continued)

(30) Foreign Application Priority Data

Feb. 14, 2014 (CN) .......................... 2014100516706

(51) Int. Cl.
*G02B 6/38* (2006.01)

(52) U.S. Cl.
CPC ......... *G02B 6/3821* (2013.01); *G02B 6/3849* (2013.01); *G02B 6/3851* (2013.01);
(Continued)

(58) Field of Classification Search
None
See application file for complete search history.

(56) References Cited

U.S. PATENT DOCUMENTS

| 4,201,444 A | 5/1980 | McCartney et al. |
| 4,217,030 A | 8/1980 | Howarth |

(Continued)

FOREIGN PATENT DOCUMENTS

| CN | 1175002 A | 3/1998 |
| CN | 1333471 A | 1/2002 |

(Continued)

OTHER PUBLICATIONS

International Search Report for International Application No. PCT/IB2015/050901 dated May 12, 2015 (2 pages).
(Continued)

*Primary Examiner* — Rhonda S Peace
(74) *Attorney, Agent, or Firm* — Merchant & Gould P.C.

(57) ABSTRACT

The present invention discloses a fiber optic connector comprises: a ferrule assembly; a spring seat provided behind the ferrule assembly; and a spring provided between the ferrule assembly and the spring seat. The spring seat has a receiving chamber having an insertion port through which a portion of the ferrule assembly is inserted into the receiving chamber; wherein the ferrule assembly is pre-assembled into the receiving chamber of the spring seat in a way that the ferrule assembly is held to be movably engaged with the spring seat. The spring is fitted and compressed in the receiving chamber. As a result, the ferrule assembly, the spring seat and the spring are pre-assembled into an integral assembly before being inserting into a connector housing. All components of the connector except for the housing may be smoothly pulled through a small long pipe as a whole. After being pulled through the pipe, all components of the connector except for the housing may be easily and quickly inserted into the housing as a whole at one time.

20 Claims, 9 Drawing Sheets

Related U.S. Application Data continuation of application No. 16/577,598, filed on Sep. 20, 2019, now Pat. No. 11,002,917, which is a continuation of application No. 15/875,199, filed on Jan. 19, 2018, now Pat. No. 10,466,425, which is a continuation of application No. 15/118,932, filed as application No. PCT/IB2015/050901 on Feb. 6, 2015, now Pat. No. 9,910,224.

(52) U.S. Cl.
CPC ......... *G02B 6/3869* (2013.01); *G02B 6/3887* (2013.01); *G02B 6/3888* (2021.05)

(56) References Cited

U.S. PATENT DOCUMENTS

| | | |
|---|---|---|
| 4,268,115 A | 5/1981 | Slemon et al. |
| 4,327,964 A | 5/1982 | Haesly et al. |
| 4,635,875 A | 1/1987 | Apple |
| 4,691,988 A | 9/1987 | Tremblay et al. |
| 4,715,675 A | 12/1987 | Kevern et al. |
| 4,762,389 A | 8/1988 | Kaihara |
| 4,787,699 A | 11/1988 | Moulin |
| 5,076,656 A | 12/1991 | Briggs et al. |
| 5,212,752 A | 5/1993 | Stephenson et al. |
| 5,216,733 A | 6/1993 | Nagase et al. |
| 5,231,685 A | 7/1993 | Hanzawa et al. |
| 5,245,683 A | 9/1993 | Belenkiy et al. |
| 5,253,315 A | 10/1993 | Fentress |
| 5,261,019 A | 11/1993 | Beard et al. |
| 5,287,425 A | 2/1994 | Chang |
| 5,452,386 A | 9/1995 | van Woesik |
| 5,465,313 A | 11/1995 | Belenkiy et al. |
| 5,471,713 A | 12/1995 | Alter et al. |
| 5,524,159 A | 6/1996 | Turgeon et al. |
| 5,619,610 A | 4/1997 | King et al. |
| 5,637,010 A | 6/1997 | Jost et al. |
| 5,640,476 A | 6/1997 | Womack et al. |
| 5,682,541 A | 10/1997 | Lee et al. |
| 5,809,192 A | 9/1998 | Manning et al. |
| 5,862,289 A | 1/1999 | Walter et al. |
| 5,863,083 A | 1/1999 | Giebel et al. |
| 5,897,393 A | 4/1999 | Haftmann |
| 5,898,808 A | 4/1999 | Vorlion et al. |
| 5,915,058 A | 6/1999 | Clairardin et al. |
| 5,946,435 A | 8/1999 | Zheng et al. |
| 5,946,436 A | 8/1999 | Takashi |
| 5,953,475 A | 9/1999 | Beier et al. |
| 6,019,520 A | 2/2000 | Lin et al. |
| 6,079,881 A | 6/2000 | Roth |
| 6,081,647 A | 6/2000 | Roth et al. |
| 6,151,432 A | 11/2000 | Nakajima et al. |
| 6,154,597 A | 11/2000 | Roth |
| 6,245,999 B1 | 6/2001 | Costigan et al. |
| 6,287,018 B1 | 9/2001 | Andrews et al. |
| 6,296,399 B1 | 10/2001 | Halbach et al. |
| 6,325,547 B1 | 12/2001 | Cammons et al. |
| 6,396,993 B1 | 5/2002 | Giebel et al. |
| 6,398,422 B1 | 6/2002 | Szilagyi et al. |
| 6,419,399 B1 | 7/2002 | Loder et al. |
| 6,428,215 B1 | 8/2002 | Nault |
| 6,429,373 B1 | 8/2002 | Scrimpshire et al. |
| 6,540,410 B2 | 4/2003 | Childers et al. |
| 6,550,978 B2 | 4/2003 | De Marchi |
| 6,579,014 B2 | 6/2003 | Melton et al. |
| 6,648,520 B2 | 11/2003 | McDonald et al. |
| 6,672,774 B2 | 1/2004 | Theuerkorn et al. |
| 6,695,489 B2 | 2/2004 | Nault |
| 6,811,321 B1 | 11/2004 | Schmalzigaug et al. |
| 6,899,467 B2 | 5/2005 | McDonald et al. |
| 6,902,140 B1 | 6/2005 | Huang |
| 6,913,392 B2 | 7/2005 | Grzegorzewska et al. |
| 6,935,789 B2 | 8/2005 | Gross, III et al. |
| 6,935,790 B2 | 8/2005 | Ozaki |
| 6,945,704 B2 | 9/2005 | Yamaguchi |
| 6,960,025 B2 | 11/2005 | Gurreri |
| 7,090,406 B2 | 8/2006 | Melton et al. |
| 7,147,384 B2 | 12/2006 | Hardcastle et al. |
| 7,198,409 B2 | 4/2007 | Smith et al. |
| 7,204,016 B2 | 4/2007 | Roth et al. |
| 7,204,644 B2 | 4/2007 | Barnes et al. |
| 7,226,215 B2 | 6/2007 | Bareel et al. |
| 7,281,859 B2 | 10/2007 | Mudd et al. |
| 7,344,317 B2 | 3/2008 | Krowiak et al. |
| 7,357,579 B2 | 4/2008 | Feldner |
| 7,369,738 B2 | 5/2008 | Larson et al. |
| 7,406,241 B1 | 7/2008 | Opaluch et al. |
| 7,510,335 B1 | 3/2009 | Su et al. |
| 7,530,745 B2 | 5/2009 | Holmquist |
| 7,572,065 B2 | 8/2009 | Lu et al. |
| 7,574,095 B2 | 8/2009 | Lock et al. |
| 7,614,797 B2 | 11/2009 | Lu et al. |
| 7,614,799 B2 | 11/2009 | Bradley et al. |
| 7,676,132 B1 | 3/2010 | Mandry et al. |
| 7,712,974 B2 | 5/2010 | Yazaki et al. |
| 7,744,288 B2 | 6/2010 | Lu et al. |
| 7,775,726 B2 | 8/2010 | Pepin et al. |
| 7,785,015 B2 | 8/2010 | Melton et al. |
| 7,806,599 B2 | 10/2010 | Margolin et al. |
| 7,838,775 B2 | 11/2010 | Montena |
| 8,311,378 B2 | 11/2012 | Niiyama et al. |
| 8,391,664 B2 | 3/2013 | Kowalczyk et al. |
| 8,393,803 B2 | 3/2013 | Hogue |
| 8,439,577 B2 | 5/2013 | Jenkins |
| 8,443,488 B2 | 5/2013 | Zhang |
| 8,480,312 B2 | 7/2013 | Smith et al. |
| 8,548,293 B2 | 10/2013 | Kachmar |
| 8,577,199 B2 | 11/2013 | Pierce et al. |
| 8,647,140 B2 | 2/2014 | Annecke |
| 8,753,022 B2 | 6/2014 | Schroeder et al. |
| 8,821,180 B2 | 9/2014 | Blakborn et al. |
| 9,130,303 B2 | 9/2015 | Anderson et al. |
| 9,182,567 B2 | 11/2015 | Mullaney |
| 9,216,530 B2 | 12/2015 | Vaccaro |
| 9,229,173 B2 | 1/2016 | Yamauchi et al. |
| 9,239,441 B2 | 1/2016 | Melton et al. |
| 9,268,102 B2 | 2/2016 | Daems et al. |
| 9,285,559 B1 | 3/2016 | Stockton et al. |
| 9,297,976 B2 | 3/2016 | Hill et al. |
| 9,383,539 B2 * | 7/2016 | Hill ................. G02B 6/4476 |
| 9,417,403 B2 | 8/2016 | Mullaney et al. |
| 9,448,370 B2 * | 9/2016 | Xue ................. G02B 6/3893 |
| 9,470,847 B2 | 10/2016 | Grinderslev |
| 9,557,496 B2 | 1/2017 | Irwin et al. |
| 9,684,138 B2 | 6/2017 | Lu |
| 9,739,971 B2 | 8/2017 | Eberle, Jr. et al. |
| 9,804,342 B2 | 10/2017 | Little et al. |
| 9,829,649 B2 | 11/2017 | Liu et al. |
| 9,910,224 B2 | 3/2018 | Liu et al. |
| 9,939,591 B2 | 4/2018 | Mullaney et al. |
| 9,971,104 B2 | 5/2018 | Tong et al. |
| 10,018,797 B2 | 7/2018 | Cheng et al. |
| 10,067,301 B2 | 9/2018 | Murray et al. |
| 10,073,224 B2 | 9/2018 | Tong et al. |
| 10,215,930 B2 | 2/2019 | Mullaney et al. |
| 10,281,649 B2 | 5/2019 | Nhep et al. |
| 10,466,425 B2 | 11/2019 | Liu et al. |
| 10,473,867 B2 | 11/2019 | Tong et al. |
| 10,534,139 B2 * | 1/2020 | Dong ................. G02B 6/3847 |
| 10,591,678 B2 | 3/2020 | Mullaney et al. |
| 10,620,385 B2 | 4/2020 | Nhep et al. |
| 10,641,970 B2 | 5/2020 | Ott et al. |
| 10,698,166 B2 | 6/2020 | Liu et al. |
| 11,002,917 B2 * | 5/2021 | Liu ................. G02B 6/3887 |
| 11,187,859 B2 | 11/2021 | Rosson et al. |
| 11,372,172 B2 | 7/2022 | Mullaney et al. |
| 11,378,756 B2 | 7/2022 | Ott et al. |
| 11,409,051 B2 | 8/2022 | Nhep et al. |
| 11,474,306 B2 | 10/2022 | Liu et al. |
| 11,506,844 B2 | 11/2022 | Liu et al. |
| 2001/0012428 A1 | 8/2001 | Nakajima et al. |
| 2001/0014197 A1 | 8/2001 | De Marchi |
| 2002/0076165 A1 | 6/2002 | Childers et al. |
| 2002/0106163 A1 | 8/2002 | Cairns |

(56) References Cited

U.S. PATENT DOCUMENTS

| | | |
|---|---|---|
| 2002/0139966 A1 | 10/2002 | Griffioen et al. |
| 2002/0186934 A1 | 12/2002 | Hug et al. |
| 2003/0063868 A1 | 4/2003 | Fentress |
| 2003/0077045 A1 | 4/2003 | Fleenor et al. |
| 2003/0215191 A1 | 11/2003 | Taira et al. |
| 2003/0231839 A1 | 12/2003 | Chen et al. |
| 2004/0023598 A1 | 2/2004 | Zimmel et al. |
| 2004/0076389 A1 | 4/2004 | Ozaki |
| 2004/0101254 A1 | 5/2004 | Erdman et al. |
| 2004/0105625 A1 | 6/2004 | Jeda et al. |
| 2004/0117981 A1 | 6/2004 | Roth et al. |
| 2004/0165832 A1 | 8/2004 | Bates et al. |
| 2004/0223699 A1 | 11/2004 | Melton et al. |
| 2005/0084215 A1 | 4/2005 | Grzegorzewska et al. |
| 2005/0135755 A1 | 6/2005 | Kiani et al. |
| 2005/0244108 A1 | 11/2005 | Billman et al. |
| 2006/0093300 A1 | 5/2006 | Marrs et al. |
| 2006/0115219 A1 | 6/2006 | Mudd et al. |
| 2007/0025665 A1 | 2/2007 | Dean, Jr. et al. |
| 2007/0036506 A1 | 2/2007 | Kewitsch |
| 2007/0172173 A1 | 7/2007 | Adomeit et al. |
| 2007/0263960 A1 | 11/2007 | Lock et al. |
| 2007/0284146 A1 | 12/2007 | Dower et al. |
| 2008/0011990 A1 | 1/2008 | Kostet et al. |
| 2008/0013891 A1 | 1/2008 | Nishioka et al. |
| 2008/0089650 A1 | 4/2008 | Legler et al. |
| 2008/0175540 A1 | 7/2008 | Zheng et al. |
| 2008/0175545 A1 | 7/2008 | Zheng et al. |
| 2008/0175546 A1 | 7/2008 | Lu et al. |
| 2008/0226234 A1 | 9/2008 | Droege |
| 2008/0226236 A1 | 9/2008 | Pepin et al. |
| 2008/0273855 A1 | 11/2008 | Bradley et al. |
| 2008/0317410 A1 | 12/2008 | Griffioen et al. |
| 2009/0148101 A1 | 6/2009 | Lu et al. |
| 2009/0148109 A1 | 6/2009 | Takahashi et al. |
| 2009/0185779 A1 | 7/2009 | Gurreri et al. |
| 2010/0202748 A1 | 8/2010 | Pierce et al. |
| 2010/0329627 A1 | 12/2010 | Donaldson et al. |
| 2011/0002586 A1 | 1/2011 | Nhep |
| 2011/0097044 A1 | 4/2011 | Saito et al. |
| 2011/0170829 A1 | 7/2011 | Bradley |
| 2011/0176785 A1 | 7/2011 | Kowalczyk et al. |
| 2012/0027355 A1 | 2/2012 | LeBlanc et al. |
| 2012/0170896 A1 | 7/2012 | Skluzacek et al. |
| 2012/0243831 A1 | 9/2012 | Chen |
| 2012/0257859 A1 | 10/2012 | Nhep |
| 2013/0058615 A1 | 3/2013 | Matthew et al. |
| 2013/0077928 A1 | 3/2013 | Hsing |
| 2013/0094828 A1 | 4/2013 | Loeffelholz et al. |
| 2013/0101258 A1 | 4/2013 | Tikosaka et al. |
| 2013/0177283 A1 | 7/2013 | Theuerkorn et al. |
| 2013/0322826 A1 | 12/2013 | Henke et al. |
| 2014/0023326 A1 | 1/2014 | Anderson et al. |
| 2014/0050446 A1 | 2/2014 | Chang et al. |
| 2014/0086534 A1 | 3/2014 | Lu et al. |
| 2014/0133808 A1 | 5/2014 | Hill et al. |
| 2014/0153878 A1 | 6/2014 | Mullaney |
| 2014/0219621 A1 | 8/2014 | Barnette, Jr. et al. |
| 2014/0295700 A1 | 10/2014 | Natoli et al. |
| 2015/0017827 A1 | 1/2015 | Vaccaro |
| 2015/0136439 A1 | 5/2015 | Vaccaro |
| 2015/0268434 A1 | 9/2015 | Barnette, Jr. et al. |
| 2016/0085045 A1 | 3/2016 | Hill et al. |
| 2016/0187590 A1 | 6/2016 | Lu |
| 2016/0306122 A1 | 10/2016 | Tong et al. |
| 2016/0349458 A1 | 12/2016 | Murray et al. |
| 2016/0356963 A1 | 12/2016 | Liu et al. |
| 2016/0356964 A1 | 12/2016 | Liu et al. |
| 2017/0131509 A1 | 5/2017 | Xiao et al. |
| 2018/0106972 A1 | 4/2018 | Liu et al. |
| 2018/0224608 A1 | 8/2018 | Liu et al. |
| 2018/0348447 A1 | 12/2018 | Nhep et al. |

FOREIGN PATENT DOCUMENTS

| | | |
|---|---|---|
| CN | 1910488 A | 2/2007 |
| CN | 101084460 A | 12/2007 |
| CN | 101084461 A | 12/2007 |
| CN | 101346653 A | 1/2009 |
| CN | 101641627 A | 2/2010 |
| CN | 201527493 U | 7/2010 |
| CN | 201926781 U | 8/2011 |
| CN | 102313934 A | 1/2012 |
| CN | 102360104 A | 2/2012 |
| CN | 102460259 A | 5/2012 |
| CN | 202583527 U | 12/2012 |
| CN | 202815276 U | 3/2013 |
| CN | 202956505 U | 5/2013 |
| CN | 203054267 U | 7/2013 |
| CN | 103353635 A | 10/2013 |
| CN | 103718392 A | 4/2014 |
| CN | 203688854 U | 7/2014 |
| CN | 203786340 U | 8/2014 |
| CN | 203825243 U | 9/2014 |
| CN | 105093420 A | 11/2015 |
| CN | 105093421 A | 11/2015 |
| EP | 0 330 399 A1 | 8/1989 |
| EP | 0 429 398 A2 | 5/1991 |
| EP | 0 740 174 A2 | 10/1996 |
| EP | 2 012 153 A1 | 1/2009 |
| EP | 2 128 675 A1 | 12/2009 |
| EP | 2 355 286 A1 | 8/2011 |
| EP | 2 482 109 A2 | 8/2012 |
| EP | 2 031 719 B1 | 1/2013 |
| GB | 2 509 532 A | 7/2014 |
| JP | 2001-147344 A | 5/2001 |
| JP | 2004-126371 A | 4/2004 |
| JP | 2007-165235 A | 6/2007 |
| JP | 2008-152266 A | 7/2008 |
| JP | 2008-299348 A | 12/2008 |
| NO | 02/052310 A2 | 7/2002 |
| WO | 01/40839 A1 | 6/2001 |
| WO | 2006/069092 A2 | 6/2006 |
| WO | 2006/069093 A1 | 6/2006 |
| WO | 2008/089416 A2 | 7/2008 |
| WO | 2008/091720 A1 | 7/2008 |
| WO | 2008/094365 A1 | 8/2008 |
| WO | 2010/118031 A1 | 10/2010 |
| WO | 2012/037727 A1 | 3/2012 |
| WO | 2012/125836 A2 | 9/2012 |
| WO | 2013/077969 A1 | 5/2013 |
| WO | 2013/126429 A2 | 8/2013 |
| WO | 2017/106507 A1 | 6/2017 |
| WO | 2017/106514 A1 | 6/2017 |

OTHER PUBLICATIONS

Fabricating with XIAMETER® High Consistency Silicon Rubber, Product Guide, Silicones Simplified XIAMETER® from Dow Corning, 50 pages (2009).

XIAMETER® brand High Consistency Rubber (HCR) Bases—Asia (Excluding Japan) Selection Guide, Silicones Simplified XIAMETER® from Dow Corning, 6 pages (2011).

* cited by examiner

FIBER OPTIC CONNECTOR AND METHOD OF ASSEMBLING THE SAME

CROSS-REFERENCE TO RELATED APPLICATION

This application is a Continuation of U.S. patent application Ser. No. 17/316,166, filed on 10 May 2021, now U.S. Pat. No. 11,506,844, which is a Continuation of U.S. patent application Ser. No. 16/577,598, filed on 20 Sep. 2019, now U.S. Pat. No. 11,002,917, which is a Continuation of U.S. patent application Ser. No. 15/875,199, filed on 19 Jan. 2018, now U.S. Pat. No. 10,466,425, which is a Continuation of U.S. patent application Ser. No. 15/118,932, filed on 15 Aug. 2016, now U.S. Pat. No. 9,910,224, which is a National stage for PCT/IB2015/050901, filed on 6 Feb. 2015, which claims the benefit of Chinese Patent Application No. 2014100516706 filed on 14 Feb. 2014 in the State Intellectual Property Office of China and which applications are incorporated herein by reference. To the extent appropriate, a claim of priority is made to each of the above disclosed applications.

BACKGROUND OF THE INVENTION

Field of the Invention

The present invention relates to a fiber optic connector and a method of assembling the fiber optic connector.

Description of the Related Art

In prior art, optical cables/fibers generally are optically coupled by following ways of:

1) Splicing Optical Fibers in Field

The way of splicing the optical cables/fibers generally comprises steps of: Firstly, processing ends of the optical fibers (including peeling off the optical cable, cleaning and cutting the optical fiber of the optical cable); Secondly, manually or automatically setting optimum splicing parameters of a splicing machine and relative positions of the optical fibers to be spliced based on material and type of the optical fiber; Thirdly, discharging an electric arc with the splicing machine to fuse the ends of the optical fibers, and slowly and linearly pushing the optical fibers toward each other to optically couple the optical fibers; Finally, contracting a heat shrinkable tube on a coupled joint of the optical fibers to protect the coupled joint, and winding the optical fibers to finish all splicing operations in the field. In this case, the splicing properties (including optical attenuation, echo, and long term reliability, etc.) of the optical fibers are in different degrees depended on various factors, such as, operation level of a splicing operator, operation steps, fiber winding level, cleanliness of electrodes of the splicing machine, splicing parameters, cleanliness of working environment, and so on. In addition, it is necessary to use various expensive apparatus, for example, high precision cutting tool, splicing machine or the like, to perform the splicing of the optical fibers in the field.

2) Cold Coupling Optical Fibers

In this solution, two processed optical fibers are fixed in a high precision V-shaped or U-shaped groove and aligned to each other. In addition, an optical matching paste is filled in the V-shaped or U-shaped groove to fill a gap between end surfaces of the two optical fibers. Compared with splicing, the cold coupling is relatively simpler and quicker, because the cold coupling does not need an electric power supply and a heat shrinkable tube to protect the spliced joint. However, the cold coupling is largely depended on cutting quality of the end surfaces of the optical fibers and the optical matching paste. If the cutting quality is poor, it decreases the coupling properties (including optical attenuation, echo, and long term reliability, etc.). Furthermore, as for the cold coupling with the V-shaped or U-shaped groove, the coupling loss is increased with the variation of the temperature. With the passage of time, because of the opened V-shaped or U-shaped groove, flowing away, pollution and aging occurring in the optical matching paste may cause the insertion loss to become larger or even reduce the optical signal to zero. Thereby, the cold coupling has a poor stability and long-term reliability.

3) Assembling Connector in Field

In the way of assembling connector in field, an optical fiber is pre-embedded in a ferrule. At one end of ferrule, an end surface of a standard connector is pre-polished, and at the other end of the ferrule, the pre-embedded fiber is placed in a high precision V-shaped groove with an optical matching paste filled therein. During assembling the connector in the field, the incoming optical fiber/cable is processed in the field (for example, opening the cable, peeling the fiber, cleaning and cutting the fiber), and inserted into the rear end of the connector until the end surface of incoming fiber abuts against the end surface of the pre-embedded fiber in the V-shaped or U-shaped groove, then the fibers are fixed by an external mechanical element. The way of assembling connector in field has a relatively high cost. In addition, it is necessary to use a special tool and an operation guide provided by the connector manufacturer. Also, because the optical matching paste is used, it has a poor stability and long-term reliability.

4) Integral Cable/Fiber Assembly in Factory

The integral cable/fiber assembly is manufactured in the factory. As for this way, it is reliable and is easy to use. However, it cannot be applied in a limited space, for example, in an application of fiber to the home or to the resident, it often needs to pull the cable/fiber assembly through a narrow pipe, especially a pipe in which other cables are paved.

In the above ways in the prior art, there are high requirements on the tool and the operator to assemble the connector in the field. Furthermore, in the prior art, before assembling a ferrule assembly, a spring and a spring seat into the connector housing, the ferrule assembly, the spring and the spring seat are separated from each other and cannot be pre-assembled together. Thereby, in the prior art, the ferrule assembly, the spring and the spring seat must be assembled into the connector housing one by one. Such way of assembling the connector is only adapted to assemble the ferrule assembly, the spring and the spring seat into the connector housing in the factory, and is not adapted to assemble the ferrule assembly, the spring and the spring seat into the connector housing in the field. As a result, the completely assembled connector in the factory cannot be pulled through the narrow pipe in the field, because the completely assembled connector has a large profile size.

SUMMARY OF THE INVENTION

The present invention has been made to overcome or alleviate at least one aspect of the above mentioned disadvantages.

According to an object of the present invention, there is provided a fiber optic connector and a method of assembling the fiber optic connector, wherein a ferrule assembly, a spring and a spring seat are adapted to be pre-assembled to an integral cable assembly having a profile size less than that of a connector housing. In this way, the cable assembly with less profile size may be easily pulled through an elongated pipe in the field. Furthermore, after pulled through the elongated pipe, the cable assembly as a whole may be quickly assembled into the connector housing in the field.

According to another object of the present invention, there is provided a fiber optic connector and a method of assembling the fiber optic connector, wherein all components of the connector except for a housing may be correctly and quickly assembled into the connector housing, effectively saving the assembling time and reducing mistake operations.

According to another object of the present invention, there is provided a fiber optic connector and a method of assembling the fiber optic connector, wherein all components of the connector except for a housing can be pre-assembled to an integral assembly, and an end surface of a ferrule and a fiber are protected from damage during assembling the integral assembly into the connector housing, improving the long term reliability of an interconnection of fiber optic connectors.

According to an aspect of the present invention, there is provided a fiber optic connector comprising: a ferrule assembly; a spring seat provided behind the ferrule assembly; and a spring provided between the ferrule assembly and the spring seat, wherein the spring seat has a receiving chamber having an insertion port through which a portion of the ferrule assembly is inserted into the receiving chamber; wherein the ferrule assembly is pre-assembled into the receiving chamber of the spring seat in a way that the ferrule assembly is held to be movably engaged with the spring seat, and the spring is fitted and compressed in the receiving chamber, so that the ferrule assembly, the spring seat and the spring are pre-assembled into an integral assembly before being inserting into a connector housing.

According to an exemplary embodiment of the present invention, the spring is pre-assembled in the receiving chamber together with the ferrule assembly or before pre-assembling the ferrule assembly.

According to another exemplary embodiment of the present invention, the ferrule assembly comprises: a ferrule; and a ferrule seat with a front end fixedly connected to the ferrule and a rear end assembled into the receiving chamber of the spring seat.

According to another exemplary embodiment of the present invention, the ferrule and the ferrule seat are formed into a single piece.

According to another exemplary embodiment of the present invention, a protrusion is formed on an outer circumference of the ferrule seat; a backstop portion is formed in the receiving chamber of the spring seat; and the backstop portion is configured to abut against the protrusion after the rear end of the ferrule seat is assembled into the receiving chamber of the spring seat, so as to prevent the ferrule seat from being withdrawn from the spring seat.

According to another exemplary embodiment of the present invention, the protrusion is configured to continuously surround a full circle of the outer circumference of the ferrule seat.

According to another exemplary embodiment of the present invention, the backstop portion is configured to be a stopping flange, extending inwardly, formed at an edge of the insertion port of the receiving chamber.

According to another exemplary embodiment of the present invention, the backstop portion is configured to be an elastic snapper formed in the receiving chamber.

According to another exemplary embodiment of the present invention, an opening is formed in the sidewall of the receiving chamber of the spring seat, and the spring is pre-assembled in the receiving chamber through the opening.

According to another exemplary embodiment of the present invention, the protrusion comprises a plurality of local protrusions, separated from each other, on the outer circumference of the ferrule seat.

According to another exemplary embodiment of the present invention, a plurality of slots are formed in the sidewall of the receiving chamber of the spring seat, and the backstop portion is directly composed of front edges of the slots.

According to another exemplary embodiment of the present invention, the spring is pre-assembled into the receiving chamber through the insertion port of the spring seat.

According to another exemplary embodiment of the present invention, the fiber optic connector further comprises: a dust cap fitted on a front end of the ferrule; a crimp ring configured to crimp a strengthening element of an optical cable on a rear end of the spring seat; and a stress relief tube sleeved on the crimp ring crimped on the rear end of the spring seat.

According to another exemplary embodiment of the present invention, the optical cable, the dust cap, the ferrule assembly, the spring seat, the spring, the crimp ring and the stress relief tube are pre-assembled together to form a first cable connection assembly as a whole before inserting into the connector housing.

According to another exemplary embodiment of the present invention, the connector housing comprises: an outer housing; and an inner housing adapted to be fitted in the outer housing.

According to another exemplary embodiment of the present invention, the first cable connection assembly is inserted into the connector housing until a protruding portion formed on the spring seat is snap-fitted in a recess formed in the inner housing, so as to assemble the first cable connection assembly and the connector housing together; and the dust cap fitted on the front end of the ferrule extends out through a hole formed in a front portion of the connector housing during inserting the first cable connection assembly into the connector housing, so as to protect a front end surface of the ferrule from damage.

According to another exemplary embodiment of the present invention, a first positioning key is formed on an inner wall of the inner housing, and a positioning slot, matched with the first positioning key, is formed in the ferrule seat, to ensure that the first cable connection assembly is correctly inserted into the connector housing.

According to another exemplary embodiment of the present invention, the first cable connection assembly is pre-assembled into the inner housing to form a second cable connection assembly, and the second cable connection assembly as a whole is inserted into the outer housing to form a complete fiber optic connector.

According to another aspect of the present invention, there is provided a method of assembling a fiber optic connector, comprising steps of:

S10: pre-assembling all components of the fiber optic connector, except for a connector housing, together to form a first cable connection assembly as a whole; and S20: inserting the first cable connection assembly as a whole into the connector housing to form a complete fiber optic connector, wherein the fiber optic connector comprises a ferrule assembly, a spring seat, a spring, and the connector housing, and wherein the ferrule assembly is pre-assembled into a receiving chamber of the spring seat in a way that the ferrule assembly may be moved relative to the spring seat and cannot be separated from the spring seat, so as to compress the spring in the receiving chamber.

According to an exemplary embodiment of the present invention, the above method further comprises a step of: pulling the first cable connection assembly through an elongated pipe before the step S20.

According to another aspect of the present invention, there is provided a method of assembling a fiber optic connector having an inner housing and an outer housing, the method comprising steps of:

S100: pre-assembling all components of the fiber optic connector, except for the outer housing, together to form a second cable connection assembly as a whole; and S200: inserting the second cable connection assembly as a whole into the outer housing to form a complete fiber optic connector, wherein the fiber optic connector further comprises a ferrule assembly, a spring seat and a spring, and wherein the ferrule assembly is pre-assembled into a receiving chamber of the spring seat in a way that the ferrule assembly is held to be movably engaged with the spring seat, so as to compress the spring in the receiving chamber.

According to an exemplary embodiment of the present invention, the above method further comprises a step of: pulling the second cable connection assembly through an elongated pipe before the step S200.

In the fiber optic connector and the method of assembling the fiber optic connector according to the above exemplary embodiments of the present invention, before being inserted into a housing of the connector, the ferrule assembly, the spring seat and the spring may be pre-assembled together to form an integral assembly having a size less than that of a housing of the connector. Accordingly, all components of the connector except for the housing may be smoothly pulled through a small long pipe as a whole. Furthermore, after being pulled through the pipe, all components of the connector except for the housing may be easily and quickly inserted into the housing as a whole at one time, saving the assembly time, avoiding mistake operations, effectively preventing the warp of the spring, protecting the end surface of the ferrule and the fiber from being damaged during the assembling process, increasing the long term reliability of the interconnection of the fiber optic connectors.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
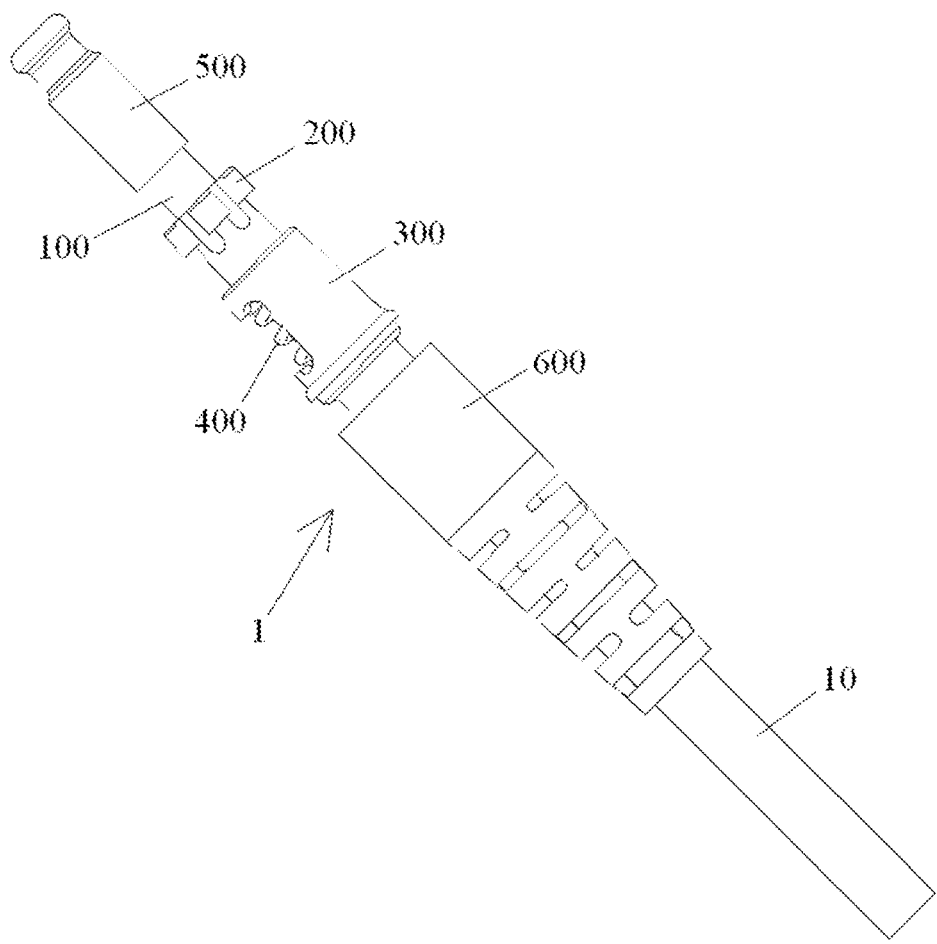
FIG. 1 is an illustrative perspective view of a first cable connection assembly formed by assembling all components of a fiber optic connector except for a housing according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a fiber optic connector comprising: a ferrule assembly; a spring seat provided behind the ferrule assembly; and a spring provided between the ferrule assembly and the spring seat, wherein the spring seat has a receiving chamber having an insertion port through which a portion of the ferrule assembly is inserted into the receiving chamber; wherein the ferrule assembly is pre-assembled into the receiving chamber of the spring seat in a way that the ferrule assembly is held to be movably engaged with the spring seat, that is, the ferrule assembly may be moved relative to the spring seat and cannot be separated from the spring seat, and the spring is fitted and compressed in the receiving chamber, so that the ferrule assembly, the spring seat and the spring are pre-assembled into an integral assembly before being inserting into a connector housing.

Figure 7:
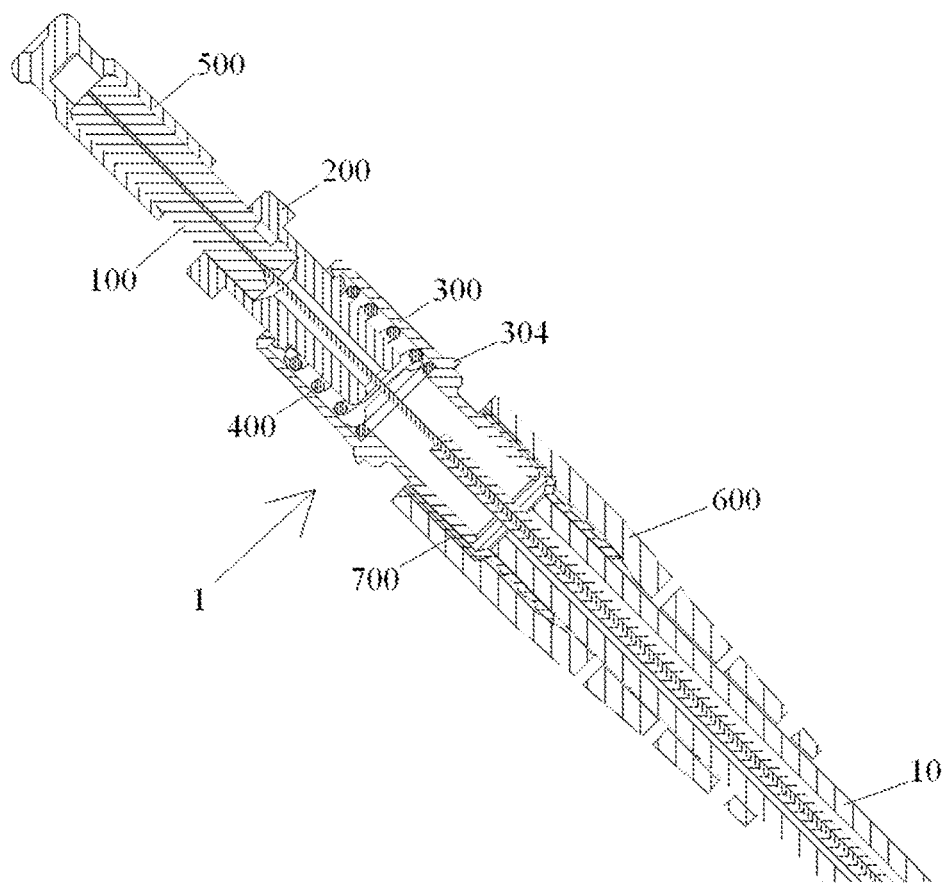
FIG. 7 is an illustrative cross section view of the first cable connection assembly shown in FIG. 1.

FIG. 1 is an illustrative perspective view of a first cable connection assembly 1 formed by assembling all components of a fiber optic connector except for a housing according to an exemplary embodiment of the present invention; FIG. 7 is an illustrative cross section view of the first cable connection assembly 1 shown in FIG. 1.

In an exemplary embodiment of the present invention, as shown in FIGS. 1 and 7, the fiber optic connector mainly comprises a connector housing (see FIG. 11, however, not shown in FIG. 1), a ferrule 100, a ferrule seat 200, a spring seat 300, a spring 400, a dust cap 500, a stress relief tube 600, a crimp ring 700 and an optical cable 10.

As shown in FIGS. 1 and 7, the dust cap 500 is fitted on a front end (distal end) of the ferrule 100, so as to protect a front end surface of the ferrule 100 and a fiber of the optical cable 10. A rear end (proximal end) of the ferrule 100 is fixed to the ferrule seat 200. The spring 400 is mounted in the spring seat 300. A rear end of the ferrule seat 200 is assembled into the spring seat 300 and compresses the spring 400 in the spring seat 300. A strengthening element (not shown, for example, Kevlar elements) of the optical cable 10 is crimped on a rear end 302 (FIG. 3) of the spring seat 300 by the crimp ring 700. The stress relief tube 600 is sleeved on the crimp ring 700. In this way, the first cable connection assembly 1 as shown in FIG. 1 is obtained.

Figure 2:
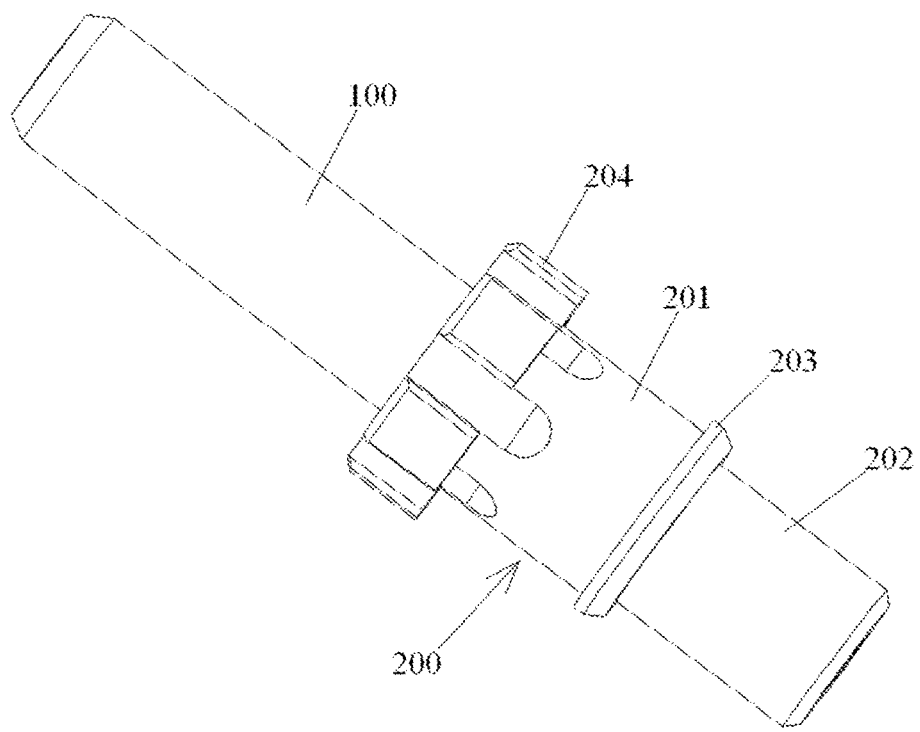
FIG. 2 is an illustrative view of a ferrule assembly of FIG. 1.
Figure 3:
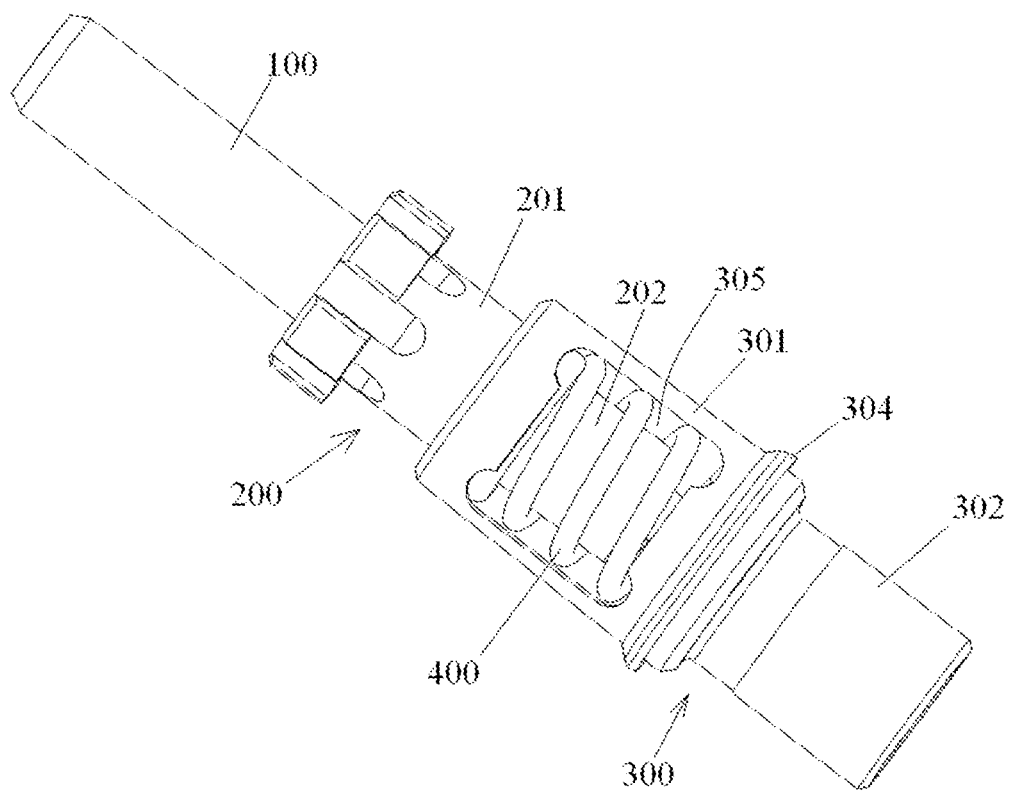
FIG. 3 is an illustrative view of a ferrule assembly, a spring and a spring seat pre-assembled together.

FIG. 2 is an illustrative view of a ferrule assembly of FIG. 1; FIG. 3 is an illustrative view of a ferrule assembly, a spring 400 and a spring seat 300 pre-assembled together; and FIG. 4 is an illustrative cross section view of the ferrule assembly, the spring 400 and the spring seat 300 pre-assembled together shown in FIG. 3.

Figure 4:
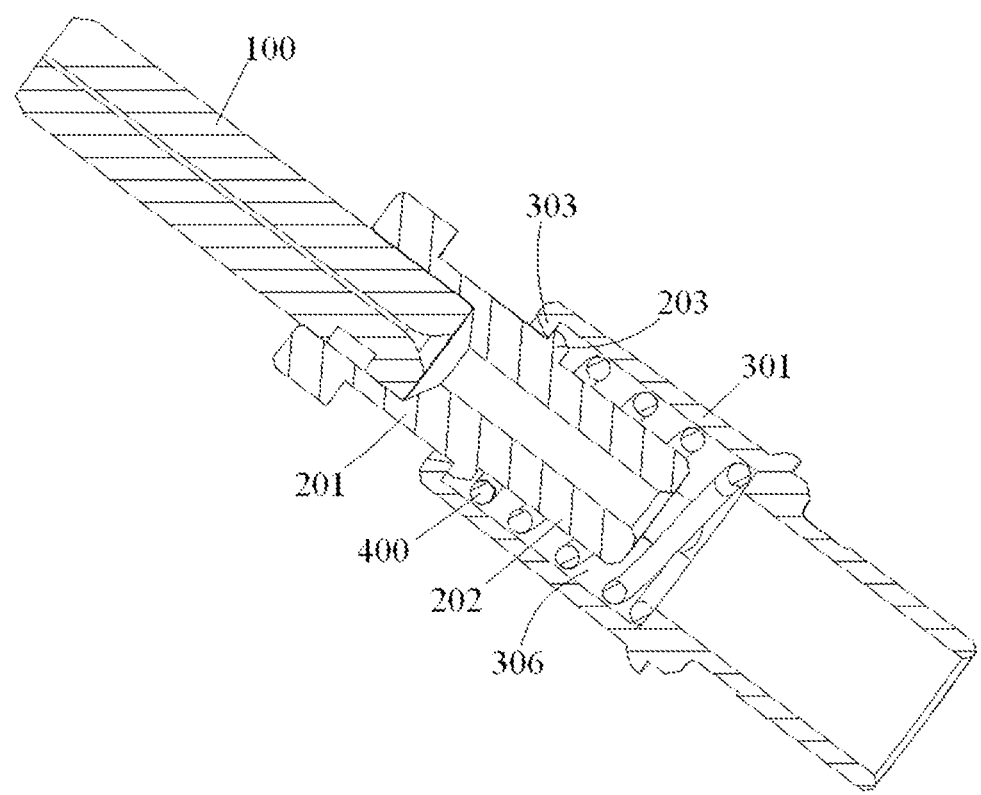
FIG. 4 is an illustrative cross section view of the ferrule assembly, the spring and the spring seat pre-assembled together shown in FIG. 3.

Hereafter, it will describe in detail the structures of the ferrule seat 200, the spring 400 and the spring seat 300 with reference to FIGS. 2-4.

As shown in FIG. 4, the spring seat 300 has a receiving chamber 306 having an insertion port facing the ferrule seat 200. The rear end of the ferrule seat 200 is adapted to be inserted into the receiving chamber 306 through the insertion port.

As shown in FIGS. 2-4, the ferrule seat 200 comprises keys 204 adjacent to the ferrule 100, a first cylindrical portion 201 provided at rear side of the keys 204, a second cylindrical portion 202 connected to the first cylindrical portion 201, and a protrusion 203 formed on the first cylindrical portion 201 opposite to the keys 204.

As shown in FIGS. 2-4, the receiving chamber 306 is formed in the front portion 301 of the spring seat 300, and a backstop portion 303 is formed in the receiving chamber 306 of the spring seat 300. In this way, when the rear end of the ferrule seat 200 is inserted into the receiving chamber 306 of the spring seat 300, the backstop portion 303 abuts against the protrusion 203, so as to prevent the ferrule seat 200 from being disengaged from the spring seat 300.

As shown in FIGS. 2-4, the second cylindrical portion 202 of the ferrule seat 200 has an outer diameter less than that of the first cylindrical portion 201 and less than an inner diameter of the spring 400. In this way, the second cylindrical portion 202 is capable of being inserted into the receiving chamber of the spring seat 300 and passing through the spring 400.

As shown in FIGS. 2-4, the protrusion 203 of the ferrule seat 200 has an outer diameter slightly larger than an inner diameter of the insertion port of the spring seat 300. Thereby, during inserting the rear end of the ferrule seat 200 into the receiving chamber 306 of the spring seat 300, the insertion port of the spring seat 300 is expanded outward under the action of the protrusion 203, to allow the protrusion 203 to enter into the receiving chamber 306. Once the protrusion 203 enters into the receiving chamber 306, the protrusion 203 compresses the spring 300 in the receiving chamber 306 and abuts against the backstop portion 303, which has been returned to its original position, under the action of the spring 300. In this way, the ferrule seat 200 cannot be withdrawn from the receiving chamber 306.

As shown in FIGS. 2-4, the first cylindrical portion 201 of the ferrule seat 200 has an outer diameter less than an inner diameter of the receiving chamber 306. Thereby, the ferrule seat 200 can be moved forward and backward in the receiving chamber 306 of the spring seat 300 by a predetermined distance, but cannot be disengaged from the receiving chamber 306 of the spring seat 300 due to engagement of the backstop portion 303 and the protrusion 203. In this way, the ferrule assembly, the spring seat 300 and the spring 400 are pre-assembled into an integral assembly before being inserting into the connector housing.

Figure 5:
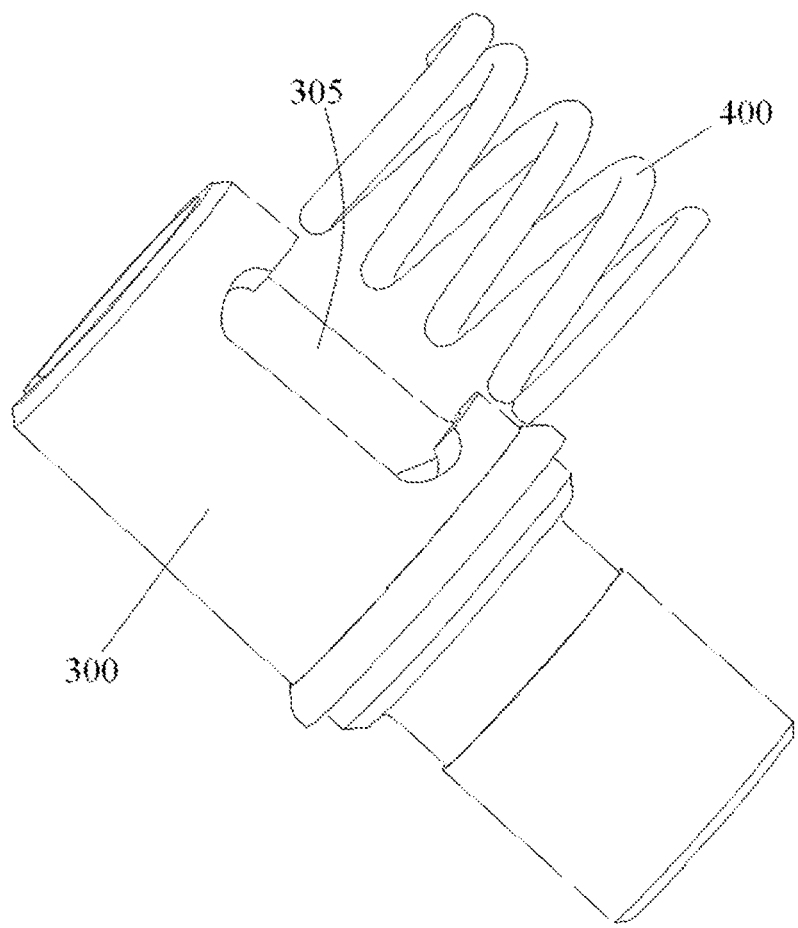
FIG. 5 is an illustrative view of the spring seat and the spring shown in FIG. 3 before the spring is mounted in the spring seat.
Figure 6:
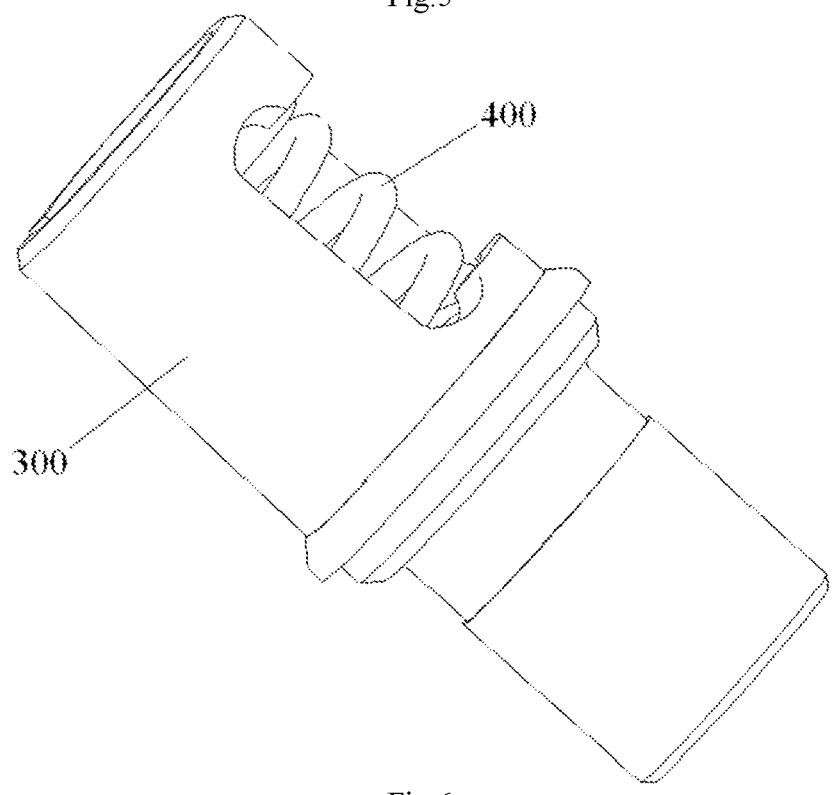
FIG. 6 is an illustrative view of the spring seat and the spring shown in FIG. 3 after the spring is mounted in the spring seat.

FIG. 5 is an illustrative view of the spring seat 300 and the spring 400 shown in FIG. 3 before the spring is mounted in the spring seat 300; and FIG. 6 is an illustrative view of the spring seat 300 and the spring 400 shown in FIG. 3 after the spring 400 is mounted in the spring seat 300.

As shown in FIGS. 5 and 6, an opening 305 is formed in the sidewall of the receiving chamber 306 of the spring seat 300. By compressing the spring 400 to reduce the length of the spring 400, the spring 400 can be mounted in the receiving chamber 306 through the opening 305.

In an exemplary embodiment, as shown in FIGS. 2-4, the protrusion 203 is configured to continuously surround a full circle of the outer circumference of the ferrule seat 200. The backstop portion 303 is configured to be a stopping flange, extending inwardly, formed at an edge of the insertion port of the receiving chamber 306.

Figure 8:
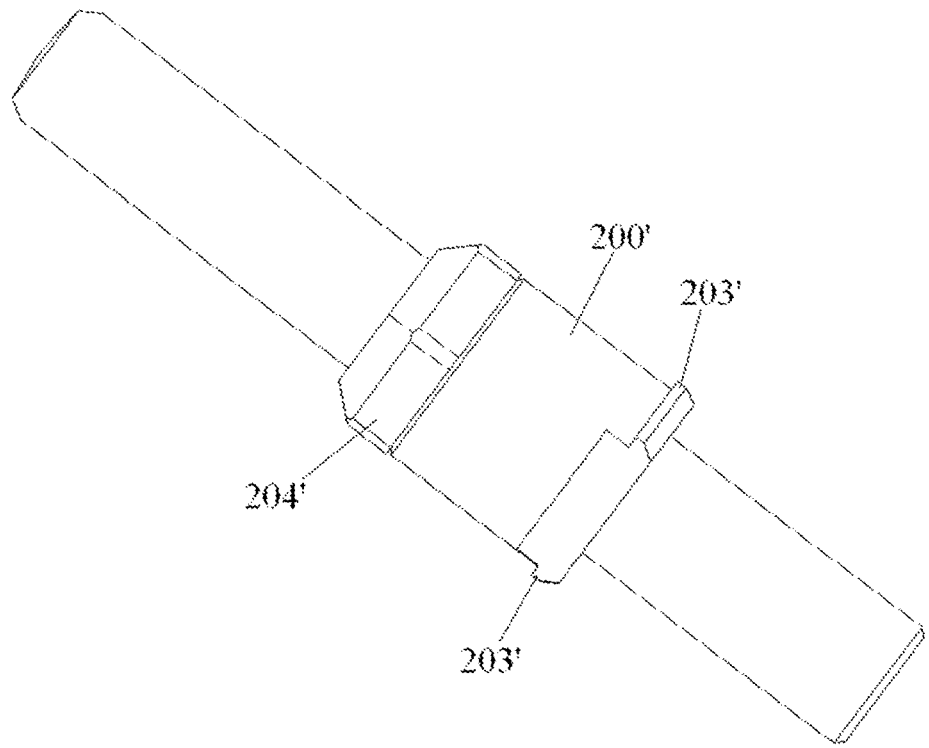
FIG. 8 is an illustrative view of a ferrule assembly according to another exemplary embodiment of the present invention.
Figure 9:
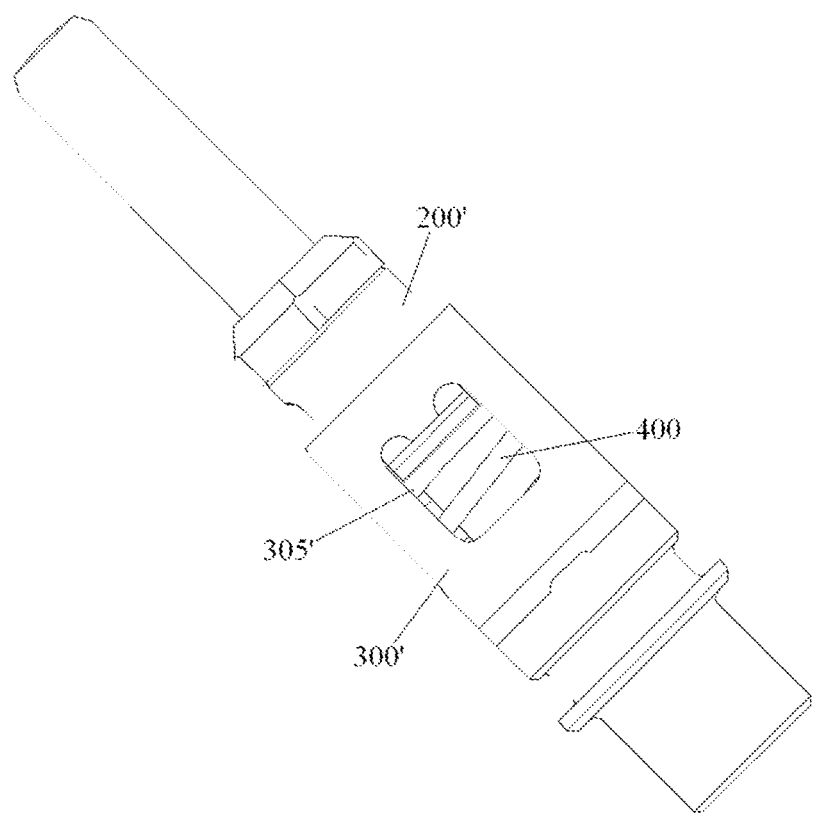
FIG. 9 is an illustrative view of a ferrule assembly, a spring and a spring seat pre-assembled together according to another exemplary embodiment of the present invention.

FIG. 8 is an illustrative view of a ferrule assembly according to another exemplary embodiment of the present invention; FIG. 9 is an illustrative view of a ferrule assembly, a spring and a spring seat pre-assembled together according to another exemplary embodiment of the present invention; and FIG. 10 is an illustrative cross section view of the ferrule assembly, the spring and the spring seat pre-assembled together shown in FIG. 9.

Figure 10:
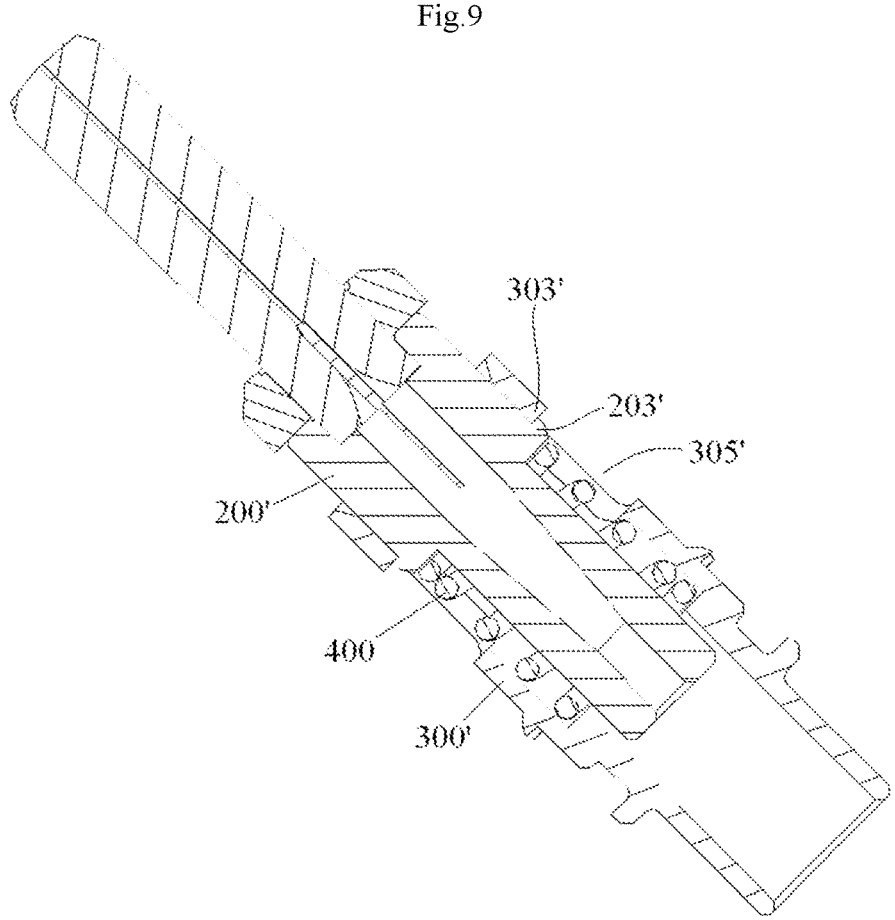
FIG. 10 is an illustrative cross section view of the ferrule assembly, the spring and the spring seat pre-assembled together shown in FIG. 9.

As shown in FIGS. 8-10, a plurality of local protrusions 203', separated from each other at a predetermined interval, are formed on the outer circumference of the ferrule seat 200'. A plurality of slots 305' are formed in the sidewall of the receiving chamber of the spring seat 300', and the backstop portion 303' is directly composed of front edges of the slots 305'. When the rear end of the ferrule seat 200' is inserted into the receiving chamber of the spring seat 300', the plurality of local protrusions 203' are received in the plurality of slots 305' and abut against the front edges of the slots 305' under the action of the spring 400. In this way, it can prevent the ferrule seat 200' from being withdrawn from the receiving chamber of the spring seat 300'.

Although it has shown two different configurations for assembling the ferrule seat 200 and the spring seat 300 together, but the present invention is not limited to the illustrated embodiments, for example, the backstop portion 303 may be an elastic snapper formed in the receiving chamber 306 as long as it can prevent the ferrule seat 200 from being withdrawn from the spring seat 300.

Figure 11:
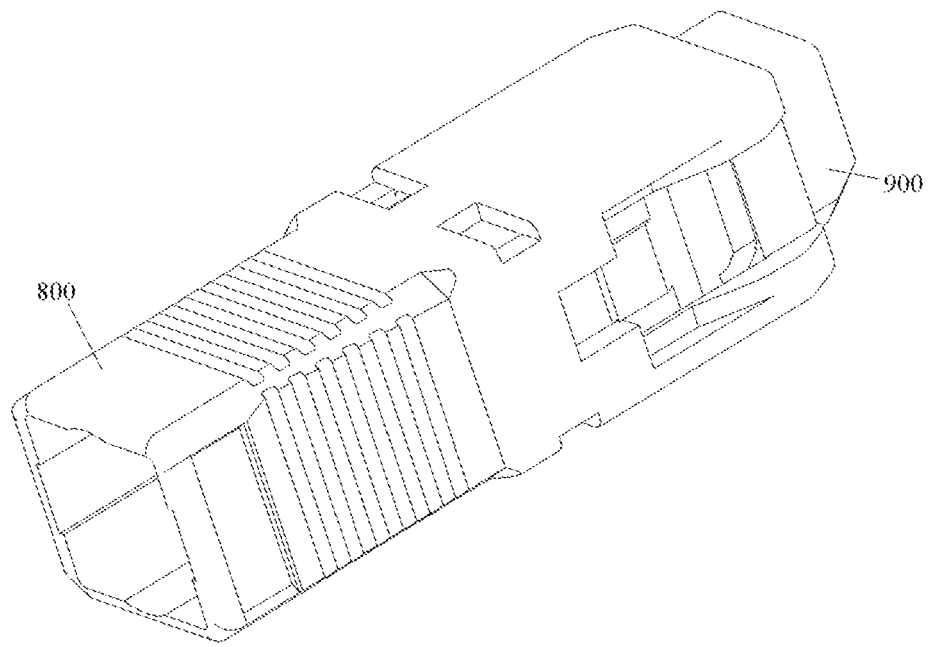
FIG. 11 is an illustrative perspective view of a connector housing according to an exemplary embodiment of the present invention.
Figure 12:
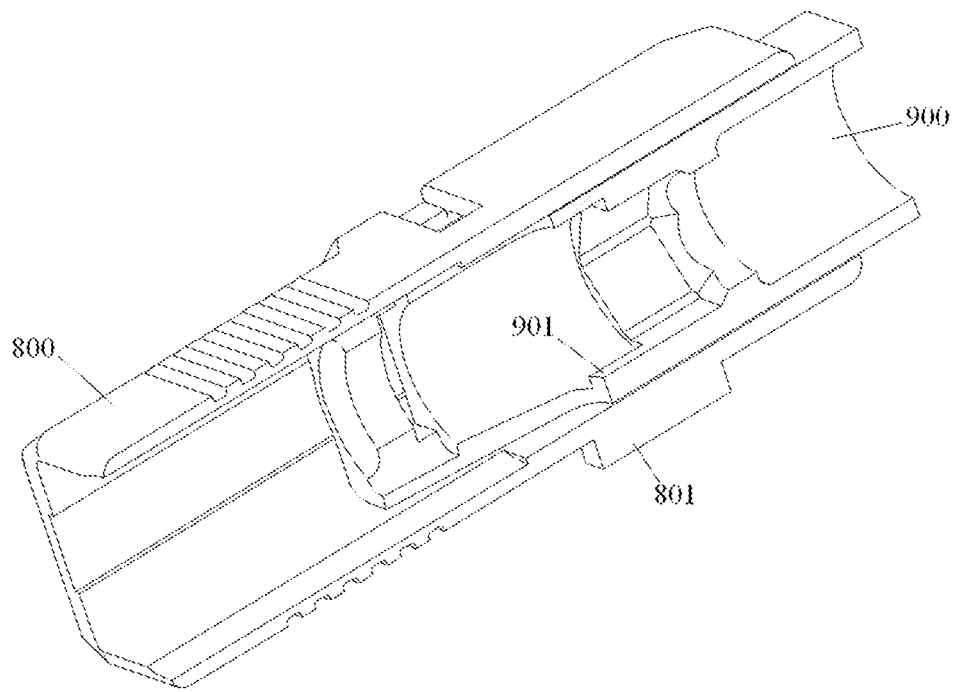
FIG. 12 is an illustrative cross section view of the connector housing of FIG. 11.
Figure 13:
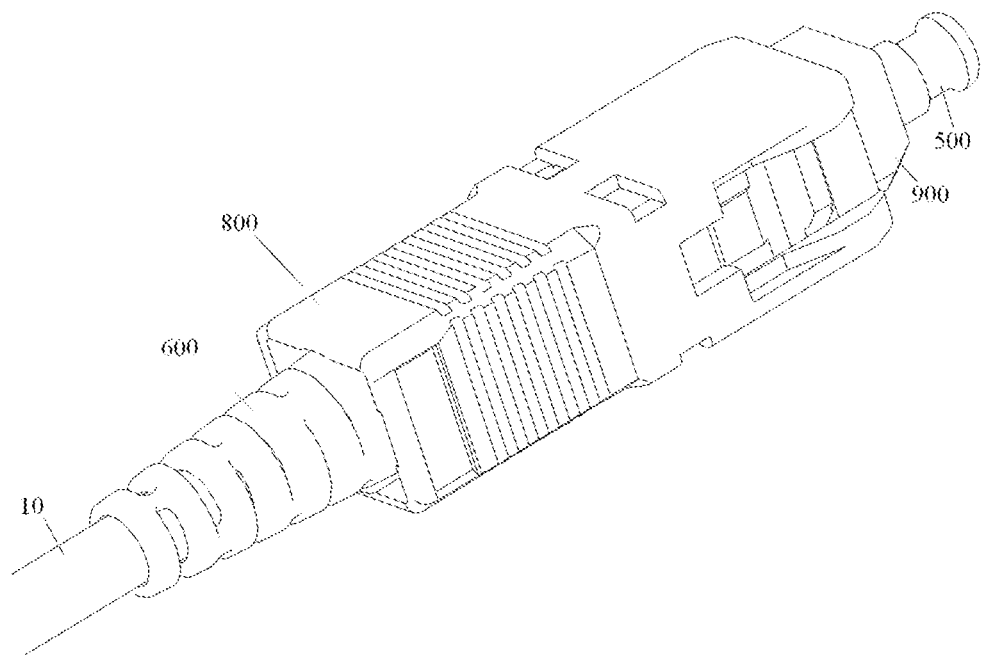
FIG. 13 is an illustrative perspective view of a fiber optic connector formed by assembling the first cable connection assembly of FIG. 1 into the connector housing of FIG. 12.
Figure 14:
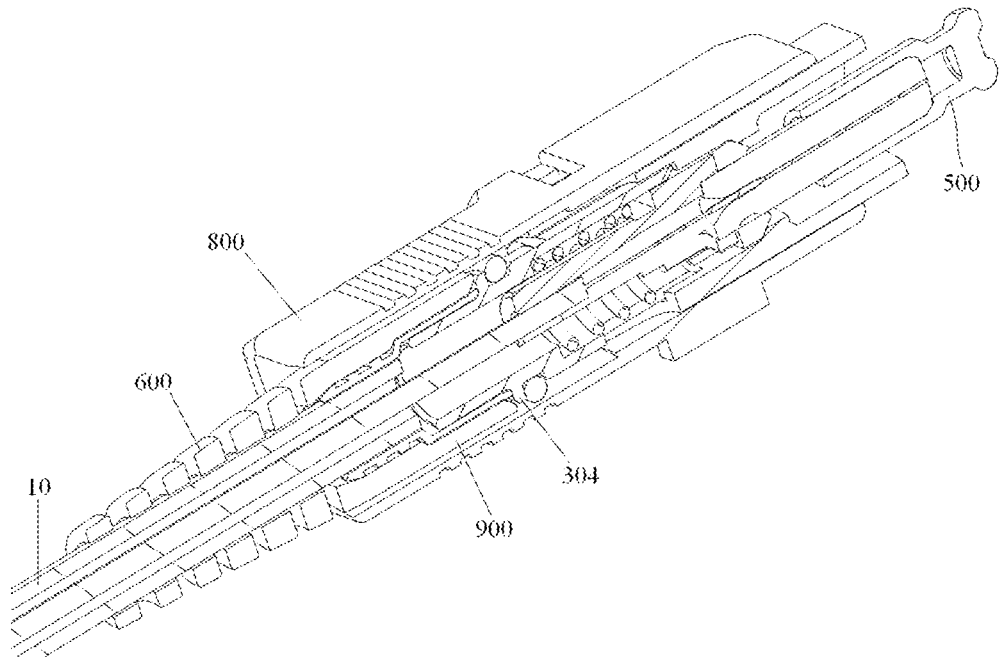
FIG. 14 is an illustrative cross section view of the fiber optic connector of FIG. 13.

FIG. 11 is an illustrative perspective view of a connector housing according to an exemplary embodiment of the present invention; FIG. 12 is an illustrative cross section view of the connector housing of FIG. 11; FIG. 13 is an illustrative perspective view of a fiber optic connector formed by assembling the first cable connection assembly of FIG. 1 into the connector housing of FIG. 12; and FIG. 14 is an illustrative cross section view of the fiber optic connector of FIG. 13.

As shown in FIGS. 11-14, in an exemplary embodiment, before being inserting into the connector housing, the optical cable 10, the dust cap 500, the ferrule assembly, the spring seat 300, the spring 400, the crimp ring 700 and the stress relief tube 600 are pre-assembled together to form the integral first cable connection assembly 1 as shown in FIG. 1. Then, the first cable connection assembly 1 as a whole is inserted into the connector housing until a protruding portion 304 formed on the spring seat 300 is snap-fitted in a recess formed in an inner housing 900 of the connector housing. In this way, the first cable connection assembly 1 and the connector housing are assembled together to form a complete fiber optic connector. During inserting the first cable connection assembly 1 into the connector housing, the dust cap 500 is not taken off from the first cable connection assembly 1, and the dust cap 500 fitted on the front end of the ferrule 100 extends out through a hole formed in a front portion of the connector housing. In this way, it can effectively protect the front end surface of the ferrule 100 from damage.

As shown in FIG. 12, a first positioning key 901 is formed on an inner wall of the inner housing 900, and a positioning slot (not shown), matched with the first positioning key 901, is formed in the ferrule seat 200. Only when the positioning slot in the ferrule seat 200 is aligned to the first positioning key 901 on the inner housing 900, the first cable connection assembly 1 may be inserted into the connector housing. Thereby, it can ensure that the first cable connection assembly 1 is correctly inserted into the connector housing.

As shown in FIG. 12, the first positioning key 901 on the inner housing 900 is configured to align with a second positioning key 801 formed on the outer housing 800, and the second positioning key 801 on the outer housing 800 is configured to be fitted in a positioning slot formed in an adapter (not shown) for receiving the fiber optic connector.

In the illustrated embodiment, because the dust cap 500 is pre-assembled on the front end of the ferrule 100 before the first cable connection assembly 1 is inserted into the connector housing, it can effectively protect the front end surface of the ferrule 100 and the optical fiber from damage during assembling the first cable connection assembly 1 into the connector housing.

Figure 15:
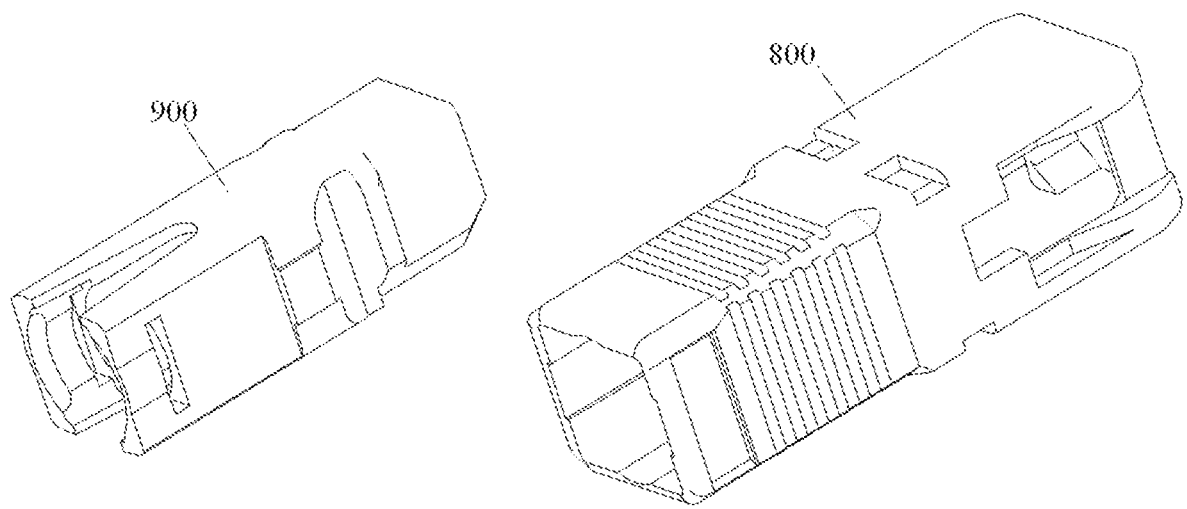
FIG. 15 is an illustrative exploded view of a connector housing according to an exemplary embodiment of the present invention.
Figure 16:
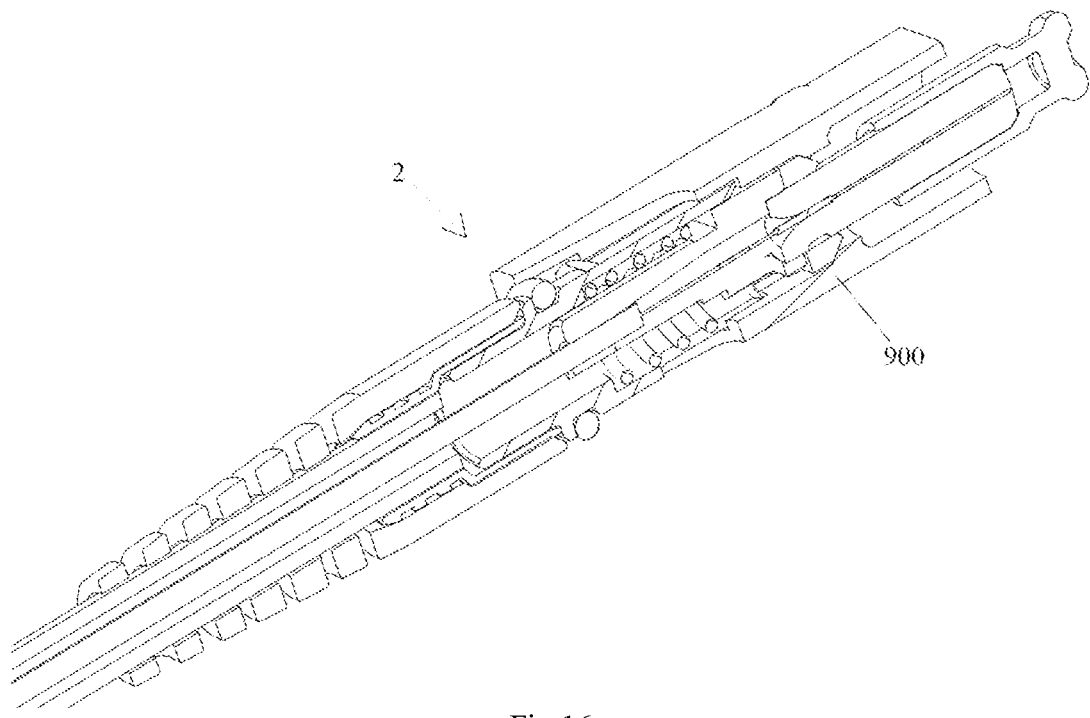
FIG. 16 is an illustrative perspective view of a second cable connection assembly formed by assembling the first cable connection assembly of FIG. 1 into an inner housing of the connector housing of FIG. 15.

FIG. 15 is an illustrative exploded view of a connector housing according to an exemplary embodiment of the present invention; FIG. 16 is an illustrative perspective view of a second cable connection assembly 2 formed by assembling the first cable connection assembly 1 of FIG. 1 into an inner housing 900 of the connector housing of FIG. 15; and FIG. 17 is an illustrative perspective view of a fiber optic connector formed by assembling the second cable connection assembly 2 of FIG. 16 into an outer housing 800 of the connector housing of FIG. 15.

Figure 17:
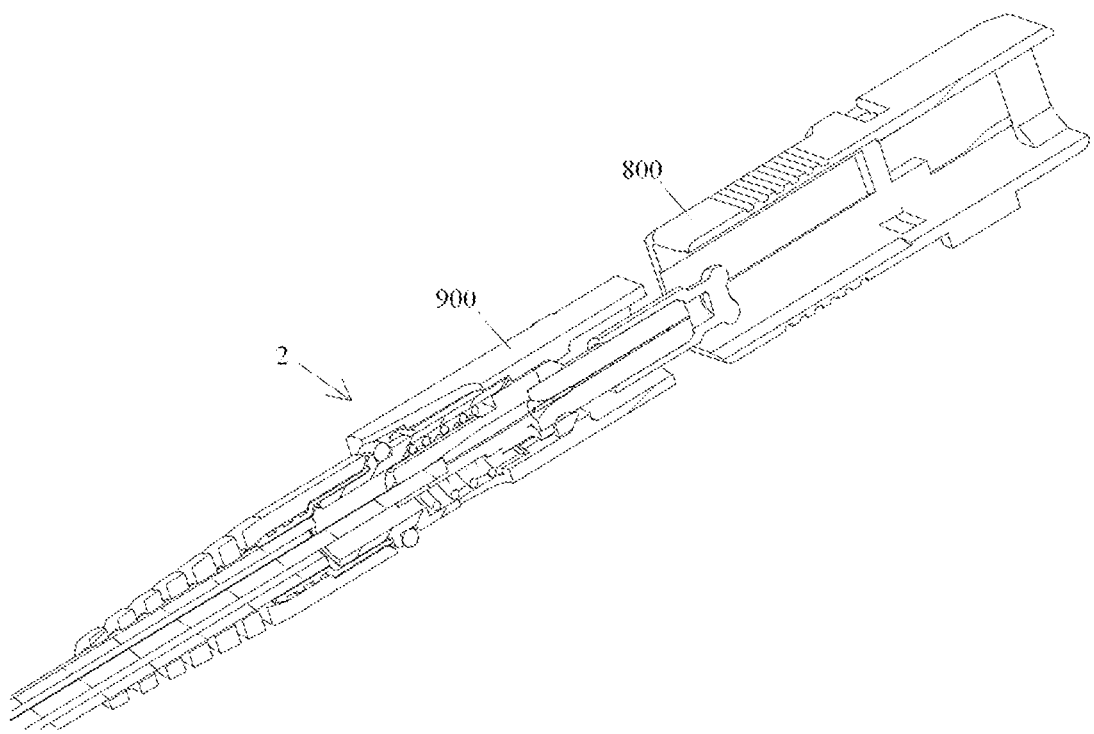
FIG. 17 is an illustrative perspective view of a fiber optic connector formed by assembling the second cable connection assembly of FIG. 16 into an outer housing of the connector housing of FIG. 15.

As shown in FIGS. 15-17, the connector housing comprises an outer housing 800 and an inner housing 900 adapted to be fitted in the outer housing 800.

In an exemplary embodiment, as shown in FIGS. 15-17, the first cable connection assembly 1 is pre-assembled into the inner housing 900 to form a second cable connection assembly 2. Thereafter, the second cable connection assembly 2 as a whole is inserted into the outer housing 800 to form a complete fiber optic connector.

According to another exemplary embodiment, there is also disclosed a method of assembling a fiber optic connector, comprising steps of:

S10: pre-assembling all components of the fiber optic connector, except for a connector housing, together to form a first cable connection assembly 1 as a whole; and S20: inserting the first cable connection assembly 1 as a whole into the connector housing to form a complete fiber optic connector.

The fiber optic connector comprises a ferrule assembly, a spring seat 300, a spring 400 and the connector housing. The ferrule assembly is pre-assembled into a receiving chamber 306 of the spring seat 300 in a way that the ferrule assembly is held to be movably engaged with the spring seat, that is, the ferrule assembly may be moved relative to the spring seat 300 and cannot be separated or withdrawn from the spring seat 300, so as to compress the spring 400 in the receiving chamber 306.

In an exemplary embodiment of the present invention, the above method further comprises a step of: pulling the first cable connection assembly 1 through an elongated pipe before the step S20.

According to another exemplary embodiment, there is also disclosed a method of assembling a fiber optic connector having an inner housing 900 and an outer housing 800, the method comprising steps of:

S100: pre-assembling all components of the fiber optic connector, except for the outer housing 800, together to form a second cable connection assembly 2 as a whole; and S200: inserting the second cable connection assembly 2 as a whole into the outer housing 800 to form a complete fiber optic connector.

The fiber optic connector further comprises a ferrule assembly, a spring seat 300 and a spring 400. The ferrule assembly is pre-assembled into a receiving chamber 306 of the spring seat 300 in a way that the ferrule assembly is held to be movably engaged with the spring seat, that is, the ferrule assembly may be moved relative to the spring seat 300 and cannot be separated or withdrawn from the spring seat 300, so as to compress the spring 400 in the receiving chamber 306.

In an exemplary embodiment of the present invention, the above method further comprises a step of: pulling the second cable connection assembly 2 through an elongated pipe before the step S200.

In the fiber optic connector and the method of assembling the fiber optic connector according to the above exemplary embodiments of the present invention, the ferrule assembly, the spring seat and the spring may be pre-assembled together to form an integral assembly having a size less than that of the connector housing. Accordingly, all components of the connector except for the connector housing may be smoothly pulled through a long narrow pipe as a whole.

Furthermore, after being pulled through the pipe, all components of the connector except for the connector housing may be easily and quickly inserted into the connector housing as a whole at one time, saving the assembly time, avoiding mistake operations, effectively preventing the warp of the spring, protecting the end surface of the ferrule and the fiber from being damaged during the assembling process, increasing the long term reliability of interconnection of the fiber optic connectors.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic connector assembly extending from a front to a rear along a longitudinal axis, the fiber optic connector assembly comprising:
    a ferrule assembly including a ferrule, a ferrule seat, and a protrusion continuously surrounding an outer circumference of the ferrule seat;
    a chamber defined by a sidewall extending from a front end to a rear end of the chamber and continuously surrounding the longitudinal axis at the front end of the chamber, the chamber being positioned partially behind the ferrule assembly, a rear end of the ferrule seat being positioned within the chamber; and
    a stopping flange extending inwardly towards the longitudinal axis of the fiber optic connector from the sidewall,
    wherein the stopping flange defines an insertion port, the insertion port being in communication with the chamber; and
    wherein the ferrule seat is adapted to be installed into the chamber along the longitudinal axis through the insertion port such that a front facing surface of the protrusion abuts a rear facing surface of the stopping flange.

2. The fiber optic connector assembly of claim 1, wherein the stopping flange and the insertion port are positioned at a front end of the chamber.

3. The fiber optic connector assembly of claim 1, wherein the sidewall is a portion of a spring seat that further defines the chamber, the fiber optic connector further including a spring positioned within the chamber and between the ferrule assembly and a forward facing surface of the spring seat, the spring being adapted to be installed into the chamber through the insertion port.

4. The fiber optic connector assembly of claim 3, wherein the protrusion is biased towards the stopping flange by the spring.

5. The fiber optic connector assembly of claim 3, wherein the sidewall defines a sidewall opening, and wherein the spring is adapted to be installed into the chamber through the sidewall opening.

6. The fiber optic connector assembly of claim 3, wherein the stopping flange includes an elastic snapper.

7. The fiber optic connector assembly of claim 1, wherein a front end of the ferrule seat is fixedly connected to the ferrule.

8. The fiber optic connector assembly of claim 1, wherein the ferrule and the ferrule seat are integrally formed into a single piece.

9. The fiber optic connector assembly of claim 1, wherein the stopping flange prevents the ferrule seat from being removed from the chamber.

10. The fiber optic connector assembly of claim 1, wherein the stopping flange extends inwardly toward the longitudinal axis of the fiber optic connector to an edge of the insertion port.

11. The fiber optic connector assembly of claim 1, further comprising:
    a dust cap fitted on a front end of the ferrule;
    a crimp ring configured to crimp a strengthening element of an optical cable; and
    a stress relief tube sleeved on the crimp ring.

12. The fiber optic connector assembly of claim 1, further comprising:
    an outer housing; and
    an inner housing positioned in the outer housing.

13. The fiber optic connector assembly of claim 12,
    wherein an inner wall of the inner housing includes a positioning key, and
    wherein the ferrule seat includes a positioning slot corresponding to the positioning key.

14. The fiber optic connector assembly of claim 1, wherein the protrusion is integrally formed with the ferrule seat as a single piece.

15. The fiber optic connector assembly of claim 1, wherein the ferrule seat includes a first cylindrical portion in front of the protrusion and a second cylindrical portion behind the protrusion.

16. The fiber optic connector assembly of claim 15, wherein the first cylindrical portion has an outer diameter that is greater than an outer diameter of the second cylindrical portion.

17. A method of assembling of fiber optic connector extending from a front to a rear along a longitudinal axis, the method comprising:
    providing a ferrule assembly including a ferrule, a ferrule seat, and a protrusion continuously surrounding an outer circumference of the ferrule seat; and
    assembling a connector subassembly by inserting a spring and a ferrule seat along the longitudinal axis through an insertion port defined by a stopping flange and into a chamber defined by a sidewall extending from a front end to a rear end of the chamber and continuously surrounding the longitudinal axis at the front end of the chamber such that the spring is captured in the chamber and such that a rear end of the ferrule seat is positioned within the chamber and a front facing surface of the protrusion abuts a rear facing surface of the stopping flange, the stopping flange extending inwardly towards the longitudinal axis from the sidewall.

18. The method of claim 17, further comprising:
moving the subassembly through an elongated pipe.

19. The method of claim 18, wherein the moving includes pulling the subassembly through the elongated pipe.

20. The method of claim 18, further comprising:
after the moving, installing the subassembly in an inner housing of the fiber optic connect; and
thereafter, installing the inner housing in an outer housing of the fiber optic connector.

* * * * *